United States Patent [19]

Kotitschke et al.

[11] Patent Number: 5,381,580
[45] Date of Patent: Jan. 17, 1995

[54] DEVICE FOR CLEANING A PAPER MACHINE WIRE WEB

[75] Inventors: Gerhard Kotitschke, Heidenheim; Otmar Kolb, Zang, both of Germany

[73] Assignee: J. M. Voith GmbH, Heidenheim, Germany

[21] Appl. No.: 204,891

[22] Filed: Mar. 2, 1994

Related U.S. Application Data

[63] Continuation of Ser. No. 920,327, filed as PCT/EP91/01129, Jun. 19, 1991, abandoned.

[30] Foreign Application Priority Data

Jun. 6, 1990 [DE] Germany .................. 4018074
Jan. 18, 1991 [DE] Germany .................. 4101350

[51] Int. Cl.⁶ ......................................... F26B 13/28
[52] U.S. Cl. ......................... 15/302; 15/309.1; 15/345
[58] Field of Search .................. 15/302, 309.1, 345

[56] References Cited

U.S. PATENT DOCUMENTS

| | | | |
|---|---|---|---|
| 1,406,821 | 2/1922 | Bennett . | |
| 1,575,526 | 3/1926 | Böcher | 15/302 X |
| 1,746,431 | 2/1930 | Kolitsch | 15/309.1 X |
| 2,472,596 | 6/1949 | Kunz | 15/309.1 X |
| 3,044,098 | 7/1962 | Stalson | 15/302 |
| 3,078,496 | 2/1963 | Doran et al. | 15/309.1 X |
| 3,265,559 | 8/1966 | Means | 162/276 |
| 3,270,364 | 9/1966 | Steele | 15/309.1 |
| 3,347,740 | 10/1967 | Goumeniouk | 134/37 X |
| 3,469,275 | 9/1969 | Deschuttere et al. | 15/345 X |
| 4,154,648 | 3/1979 | Osterberg | 162/195 |
| 4,643,775 | 2/1987 | Reba et al. | 15/302 |
| 4,741,113 | 5/1988 | Burdick et al. | 15/309.1 X |

FOREIGN PATENT DOCUMENTS

| | | |
|---|---|---|
| 106201 | 11/1899 | Germany . |
| 2058461 | 11/1970 | Germany . |
| 2312072 | 3/1973 | Germany . |
| 288699 | 9/1953 | Switzerland .......... 15/309.1 |
| 1018367 | 10/1964 | United Kingdom . |
| 2127326 | 9/1982 | United Kingdom . |

Primary Examiner—Chris K. Moore
Attorney, Agent, or Firm—Baker & Daniels

[57] ABSTRACT

The device has two mutually parallel slats extending crosswise to the running direction of the wire, namely an approach slat and a departure slat which with a wire guide surface each touch the revolving wire. Contained between the two slats is a blowing slot connected to a compressed air supply. Forming between the approach slat and the wire is a wedge-shaped gore tapering in the wire running direction, into which gore empties a water spray system. The departure slat has a step type clearance at the point where the wire leaves the wire guide surface.

18 Claims, 5 Drawing Sheets

DEVICE FOR CLEANING A PAPER MACHINE WIRE WEB

This is a continuation of application Ser. No. 07/920,327, file Aug. 21, 1992 now abandoned.

BACKGROUND OF THE INVENTION

The invention concerns a device for cleaning a revolving paper machine wire, and, more particularly, a device for cleaning a paper machine wire web having an elongated approach member and an elongated departure member, each said elongated member formed with a wire guide surface, and a blowing slot formed therebetween.

Such or similar devices have become known from U.S. Pat. No. 3,265,559. They were successful specifically in the cleaning of felts.

In selecting a cleaning system, various aspects need to be observed. What matters first of all is the cleaning effect itself, which must be simultaneous and uniform across the entire machine width. Moreover, the energy consumption plays an important role. Furthermore, attention must be paid to low wear of the participating components. Lastly, waste water problems need to be avoided.

In cleaning of a wire web, water jets have been primarily employed. Such water jets are sprayed at high pressure from spray nozzles at the wire to be cleaned. While the cleaning effect is very good, it is, however, striped at the spacing of the spray nozzles. The expense is rather high, especially the energy demand. Moreover, a waste water problem may occur.

The problem underlying the invention is to design a device in a way such that the cleaning effect will be improved and that also all other problems, associated with the air nozzles, will be solved in satisfactory fashion.

SUMMARY OF THE INVENTION

The problems of conventional devices for cleaning a paper machine wire web are solved with the present invention by providing a wedge-shaped space formed between the elongated approach member and the wire web, the wedge-shaped space tapering in the running direction of the wire web. A water spray system sprays water into the wedge-shaped space.

In detail, the inventor recognized the following:

The inventional introduction of water into the wedge-shaped space between the elongated approach member and the wire web causes the wire web, although only rather slightly, to lift off the approach slat. At the same time, as a result of the sprayed water, a water film forms on the inside of the wire web, which more or less forms a thin water film between the individual wires of the wire web.

Thus, the air discharging from the blow nozzle impinges on a practically continuous wall of water.

Contrary to conventional designs which blow air through the wire, the air jet of the present invention thus can no longer choose the path of least resistance through open spaces of the wire web. It must penetrate the entire wall of water. In the process, it entrains the dirt particles clinging to the wire, which are embedded in the water and deposited on the wire web. At any rate, tests have shown that the share of entrained dirt particles increases abruptly if according to the invention water is introduced only in the wedge-shaped space between the wire web and the elongated approach member. The wire web is simultaneously cleaned across the entire width.

In several applications, various additional requirements are imposed on the wire cleaning system, which are cited hereafter:

1. To be avoided is the deposition of dirt on the system in continuous operation, which impairs its effectiveness.
2. In order to save energy, a maximally low water pressure should suffice for the water spray system while nevertheless achieving a maximally uniform spray water distribution across the wire web width.
3. It should be possible to adapt the system to various wire web running speeds, thus keeping the cleaning effect equally high at different wire web running screens.
4. The system should be usable also where the fiber web formed is in normal operation lifted off the wire web (for instance by means of a pick-up suction roll) and where during the start-up phase the fiber web must be passed from the wire web to a scrap dissolution system.

BRIEF DESCRIPTION OF THE DRAWINGS

The invention will be more fully explained with the aid of the drawing, which in detail shows in FIG. 1 through 4, schematic illustrations of various wire web sections for paper machines.

DETAILED DESCRIPTION OF THE INVENTION

Figure 1:
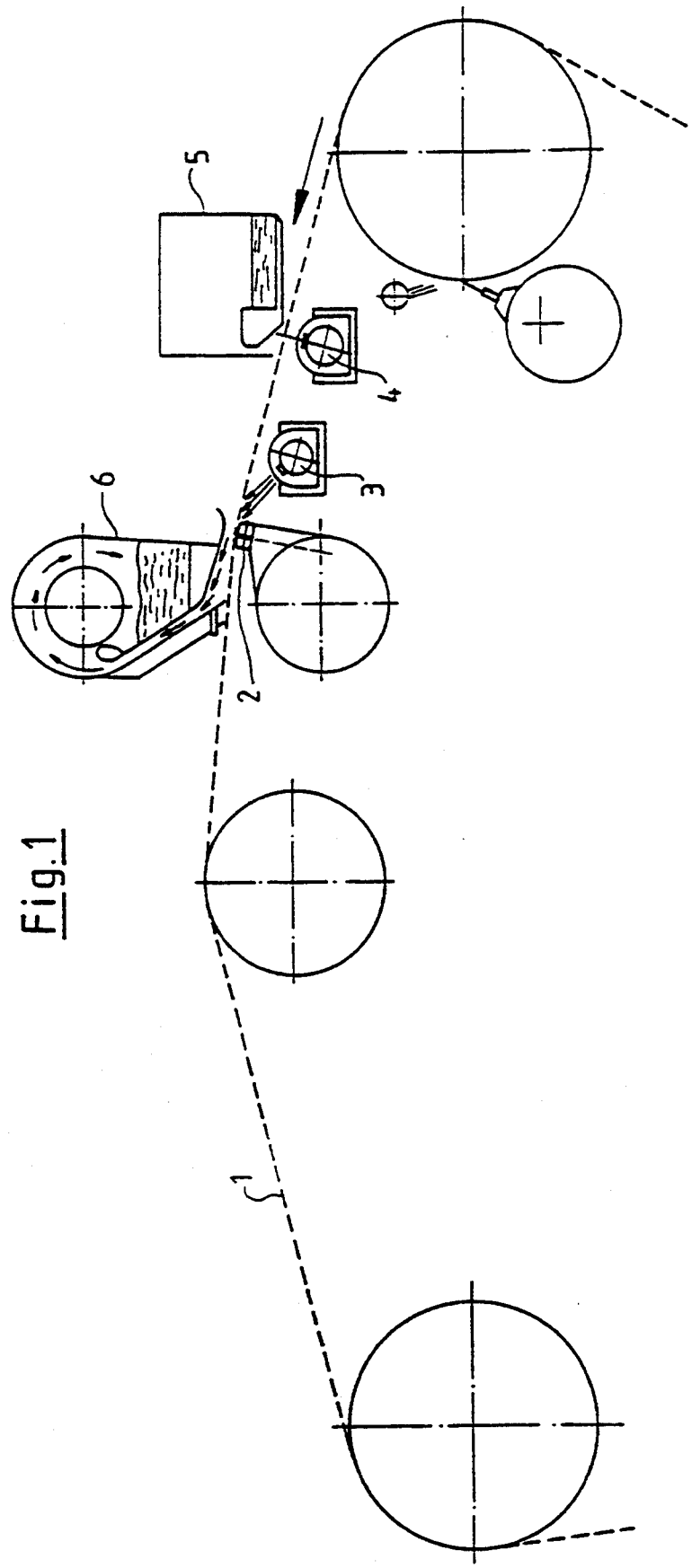

The wire web section illustrated in FIG. 1 features a wire web 1 wrapping around a number of rolls and moving in the direction of the arrow. The actual cleaning device comprises a high-pressure blow nozzle 2 and a spray pipe 3 for application of water jets. Further structure of the cleaning device includes, for instance, another spray pipe 4, which shoots water jets through wire web 1. The water jets are collected in a suction hood 5. Coordinated with inventional cleaning system 2, 3 is a suction system 6 with a lateral vacuum connection.

Figure 2:
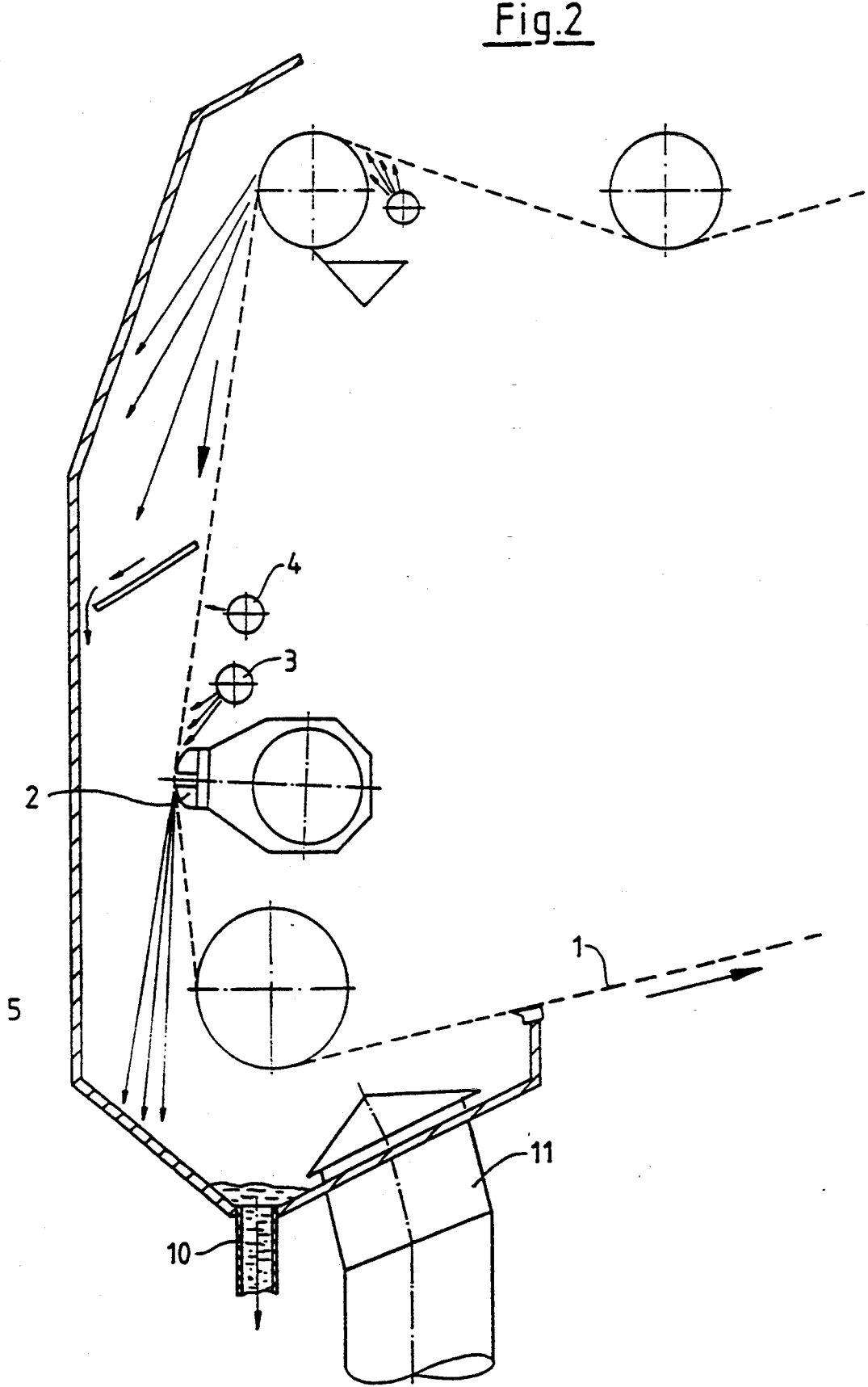
Figure 3:
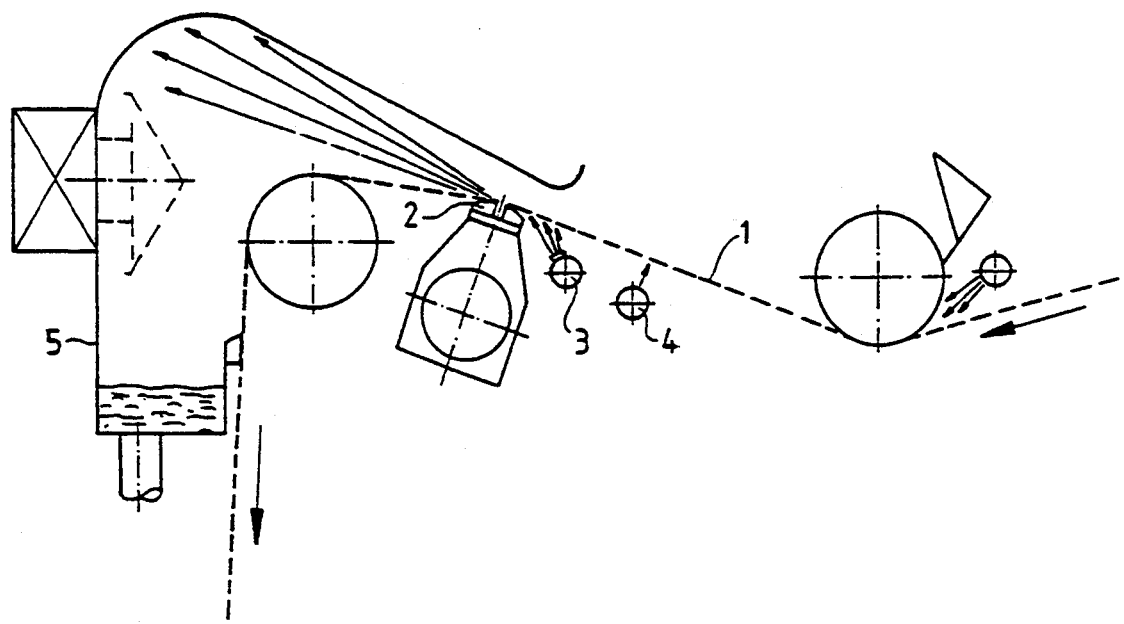
Figure 4:
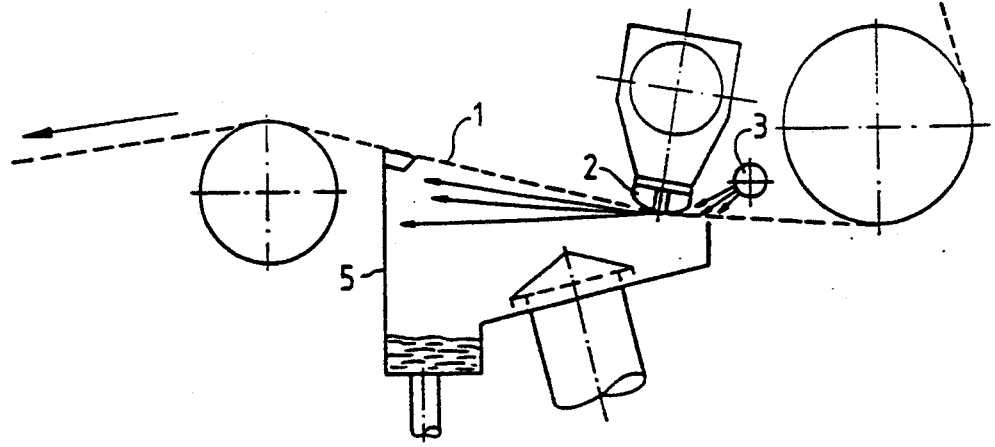

In the system according to FIG. 2, blow nozzle 2 and spray pipe 3, in this case a flat jet spray pipe, are again the major components of the cleaning system. These two components are arranged on the inside of the wire web, i.e., inside the loop formed by wire web 1. Provided on the outside is a suction hood 5 which includes a water drain 10 and is connected to a suction pipe 11. Preceding the flat jet spray pipe 3 is a needle jet spray pipe 4. While this is helpful, it is not entirely sufficient. The embodiments according to FIGS. 3 and 4 represent modifications. Essential here are also high-pressure blow nozzle 2 with preceding spray pipe 3. Suction hood 5 simultaneously collects the splash water and provides suction. They feature appropriate connections, the same as the embodiment according to FIG. 2.

Figure 5:
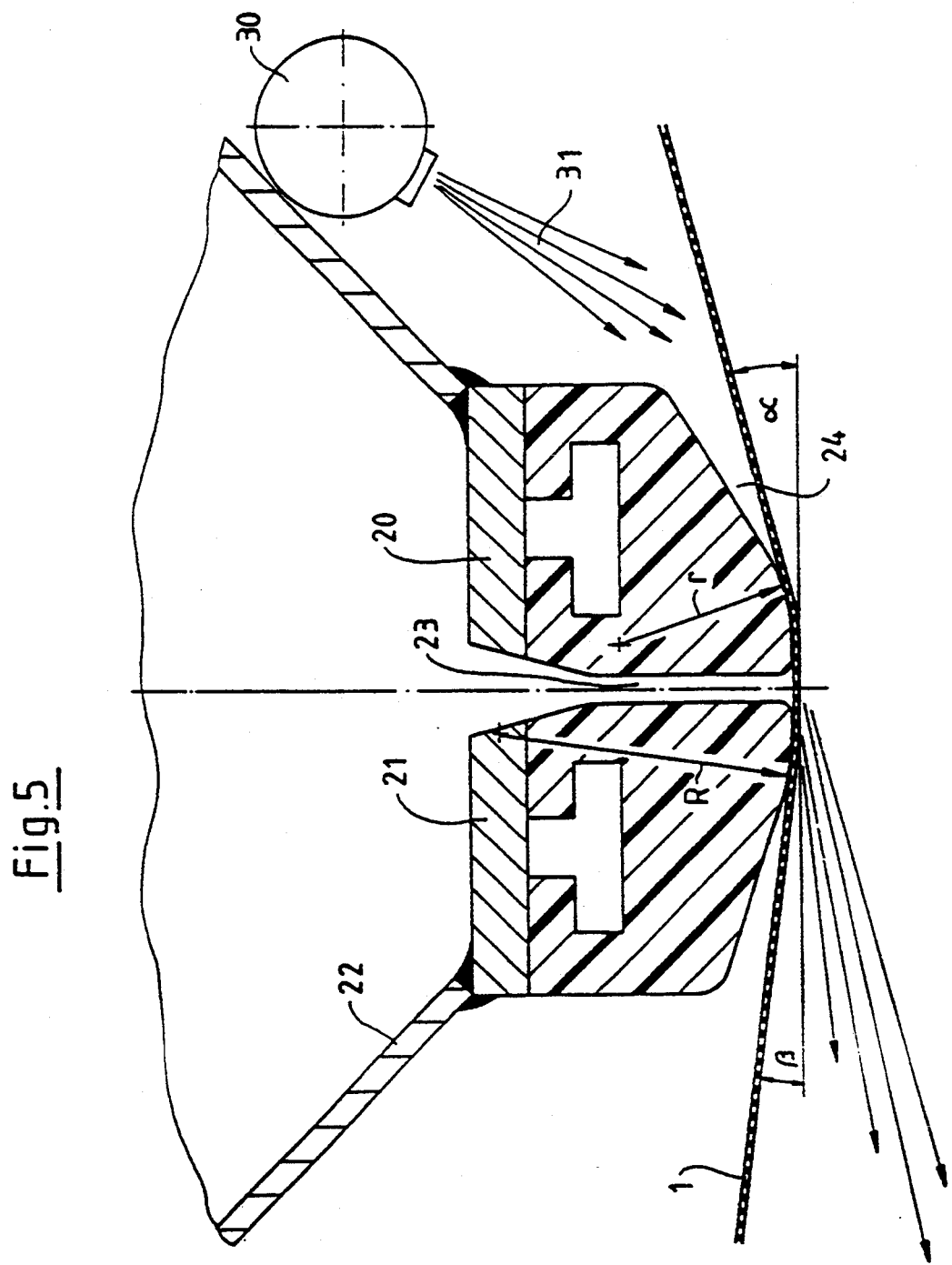
FIG. 5, scaled up, the actual system according to the invention, with high-pressure blow nozzle and a water spray system.

FIG. 5 depicts in more detail the structure of the high-pressure blow nozzle, which comprises an elongated approach member 20, an elongated departure member 21 and a pressure tube 22. Forming an assembly, these three components extend across the entire machine width, so that wire web 1 is cleaned across its entire width. Elongated approach member 20 and elongated departure member 21 form a blowing slot 23, which without interruption can extend across the wire web width. But it may also be interrupted. It may be replaced, e.g., by a number of bores, which as well extend across the entire wire web width. Decisive is the shape of the elongated approach member 20 and the routing of the wire web 1. As can be seen, these two form an angle α with each other. In the present case, the angle α amounts to about 30°. The wedge-shaped space 24 formed therebetween tapers in the running direction of wire web 1.

Preceding wedge-shaped space 24 is a spray pipe 30 arranged in such a way that it directly or indirectly supplies spray jets 31 of water to wedge-shaped space 24. The supply of water may occur at a more or less high pressure.

Elongated approach member 20 and elongated departure member 21 are made, at least on their surface touched by wire web 1, of wear-resistant material, for instance, ceramic.

The wire web 1 contacts the elongated approach member 20, which at this point has a radius of about 10 to 50 mm. Due to its reversal, the wire web 1 is already dewatered at this radius due to eccentric force.

The blowing slot 23 has a width of 1 to 10 mm.

The elongated departure member 21 forms a radius in the departure area thereof. It ensures that the wire web will not be lifted off elongated departure member 21 by the air pressure, so that the blowing air cannot escape. The radius required on elongated departure member 21 depends on operating parameters such as air pressure, wire web permeability, wire web tension and others. The radius is so selected that the remaining contact pressure of the wire web on the reversal surface of elongated departure member 21 will be minimal, keeping wear of wire web 1 and elongated departure member 21 minimal.

The design of the control is such that the air will be turned off immediately in case of water failure and that the blowing nozzle will swing out of the wire, with a slight time delay.

Figure 6:
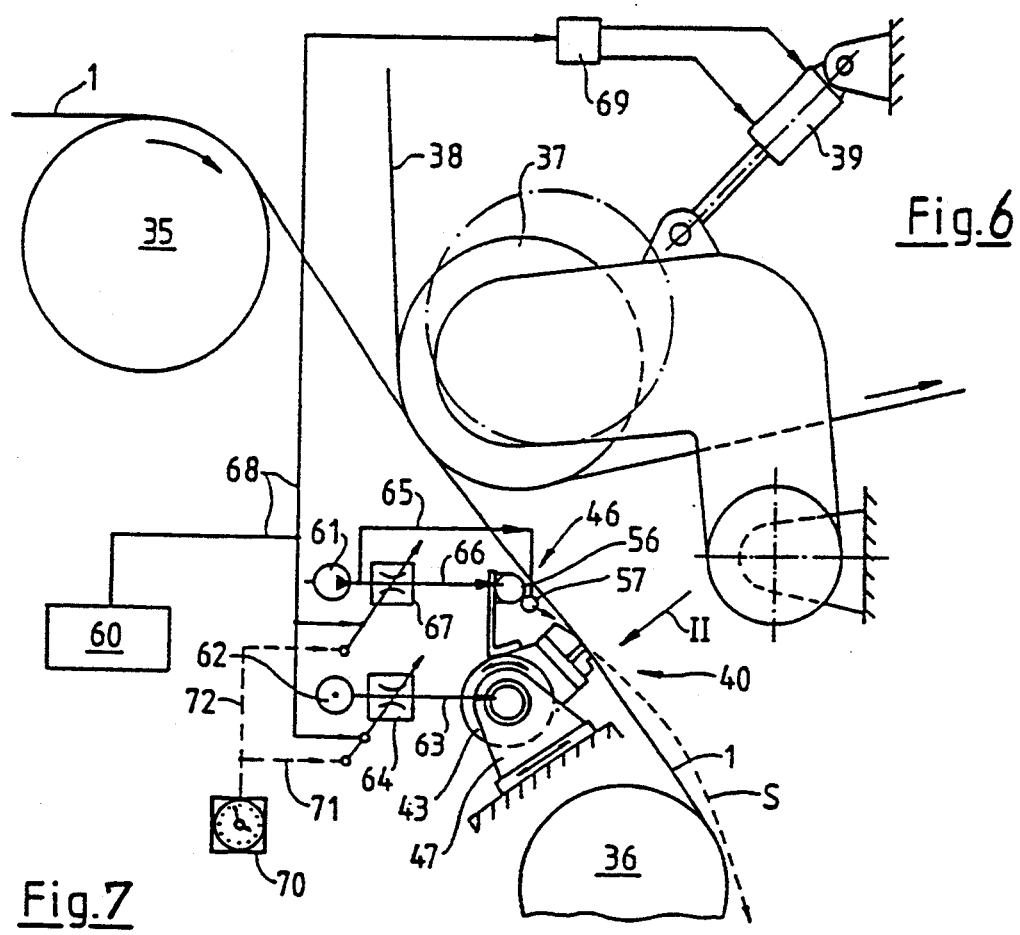
FIG. 6, schematically, part of a paper machine wire web section with a wire web cleaning system.

FIG. 6 depicts a continuous wire web 1 which in known fashion runs across a wire suction roll 35 and from there across a wire web cleaning system 40 and to a wire guide roll 36. The paper web approaching on the wire web 1 (and still wet) is in normal operation picked off the wire web 1 and passed to the successive (not illustrated) press section, with the aid of a continuous felt 38 and a pick-up section roll 37. During the start-up phase or upon operational breakdown, the pick-up suction roll 37 is with the aid of hydraulic cylinders 39 lifted off the wire web 1 in known fashion (as illustrated by dash-dot lines). In this state of operation, the fiber of paper web runs with wire web 1 up to the wire cleaning system 40, is separated by it from the wire web 1 and runs then approximately along the broken line S downward into a scrap dissolution system (not shown).

Figure 8:
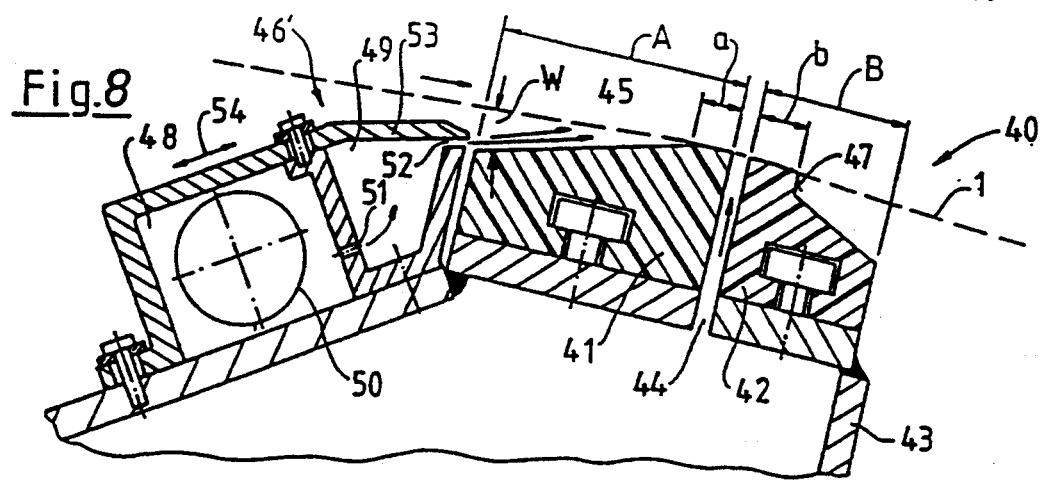
FIG. 8, scaled up and modified as compared to FIG. 6, a partial cross section of the wire web cleaning system.

As can be seen best from FIG. 8, the wire cleaning system 40 has an elongated approach member 41 and an elongated departure member 42, each touching the revolving wire web 1 with a wire guide surface. The width of the wire guide surface of the elongated approach member 41 is marked "a", the width of the wire guide surface of the departure slat is marked "b". The two wire guide surfaces are approximately equally wide, while the overall width A of the approach elongated member 41 is nearly twice as large as the overall width B of the elongated departure member 42. The wire guide surfaces may be predominantly flat (with rounded edges) or have a slightly convex curvature. The elongated approach member 41 and elongated departure member 42 are fastened to the support body 43 in such a way that an air blowing slot 44 remains between the two elongated members. The support body is configured as a hollow body serving to supply blowing air. Forming between elongated approach member 41 and the wire web 1 is a wedge-shaped space 45 (with angle w) tapering in the running direction of wire web 1. A water spray system 46 sprays water jets across the entire wire web width into wedge-shaped space 45.

At the point where the wire web 1 leaves the wire guide surface, the elongated departure member 42 features a stepped clearance 47; the latter forms with the wire guide surface a relatively sharp departure edge, which the wire web must touch. This configuration achieves that the surfaces of the elongated departure member 42 which are not in contact with the wire web tend less than heretofore to accumulate dirt that might impair the proper functioning of the wire web cleaning system 40.

Due to the larger overall width "A" of elongated approach member 41, the wedge-shaped space 45 (in the direction of wire travel) is longer than heretofore. This gives rise to the possibility, more so than heretofore, that the wire web 1 accelerates the water jets coming from the water spray system 46. Thus, the pressure of the supplied water can be reduced as compared to formerly, thus saving energy. To allow the adjustment of optimum conditions in this respect, the angle w between wire web 1 and elongated approach member 41 is suitably changed, specifically to thereby adapt it to the wire web travel speed. The support body 43 is for that purpose pivotably supported in bearing blocks 72. Additionally or alternatively to it, the support body 43 can be shifted toward the wire 1 or away from it, along with the bearing blocks 72.

According to FIG. 8, the water spray system, referenced 46' overall, is formed of two mutually parallel chambers extending transverse to the direction of wire web travel; these are a distribution chamber 48, to which a water supply line 50 is connected and a nozzle chamber 49. Distributed across the length of the chambers several channels 51 connect the distribution chamber 48 with the nozzle chamber 49. This ensures that the water discharge velocity is uniform across the width of the wire web 1. In variation from FIG. 3, the distribution could be replaced by a pipe which through several lines corresponding to the channels 51 is connected to the nozzle chamber 49.

A series of individual spray nozzles may be provided on the nozzle chamber 49. Alternatively, a water discharge gap 52 may be formed between two walls of the nozzle chamber (FIG. 8). If a variability of the amount and/or discharge velocity of the water is desired, a wall 53 of the nozzle chamber 49 (which at the same time is a defining wall of the distribution chamber 48) can be shifted back or forth in the direction of double arrow 54, thereby varying the clearance of the gap 52.

Figure 7:
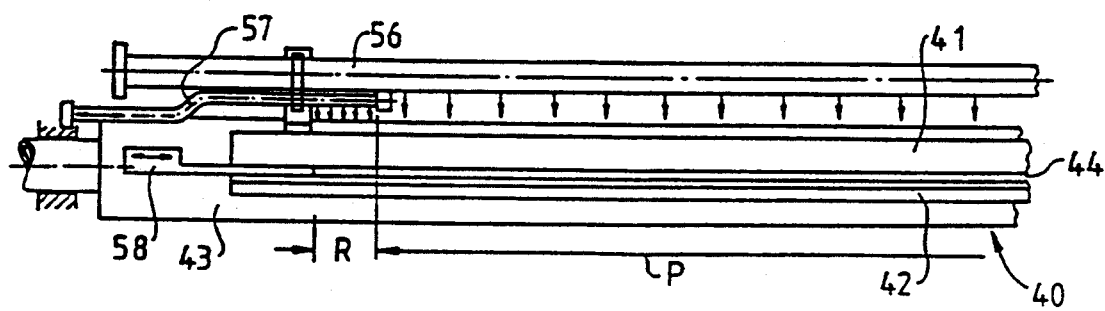
FIG. 7, a partial view of the wire web cleaning system in the direction of arrow II in FIG. 6.

According to FIG. 6 and 7, the water spray system 46 comprises a spray pipe 56 which extends across the entire wire web width, and additionally, in the area of the two fiber web edges, an edge spray pipe 57 each (of which only one is visible in the drawing). The edge spray pipe 57 has per centimeter of wire width a greater number of spray nozzles, which are arranged distributed across the width R of the edge strip. As is known, an edge strip is normally trimmed off the paper web formed in the wire web section, on each of the two edges, which edge strip must in normal operation be picked off the wire web 1 by means of the wire web cleaning system 40. Only the remaining paper web with the width P continues to be advanced by means of the felt 38.

Now and then it happens that the width P of the paper web to be produced needs to be changed. To enable the adaptation of the wire web cleaning system 40 to different fiber web widths P, the following is provided for: The edge spray pipe 57 can be moved parallel to the blowing slot 44. Moreover, the length (P+2R -measured crosswise to the wire travel direction) of the blowing slot 44 is variable with the aid of adjustable edge slides 58.

FIG. 6 also shows the control of the hydraulic cylinders 39 of the pick-up suction roll 37 and the control of the air and water supply to the wire web cleaning system 40. Illustrated is a central control unit 60, a water pump 61 and a compressed air supply 62. The compressed air line 63 with pressure control valve 64 connects the compressed air supply 52 via the hollow support body 43 to the blowing slot 44. The water pump 61 connects directly to the edge spray pipe 57, through a line 65. Additionally provided is a line 66 with pressure control valve 67 for supplying the spray pipe 56. A common control line 68 connects the control center 60, for one, with the pressure control valves 64 and 67 and, for another, with a transmitter 69 controlling the hydraulic cylinders 39. The following can be accomplished thereby: During normal operation (pick-up suction roll 37 touching the wire 1) air and water are supplied to the wire web cleaning system 40 at relatively low pressure. An exception are edge spray pipes 57, to which water is fed at high pressure through the line 65, so that the edge strips will be safely removed from the wire web 1. As soon as the control center 60 emits a signal for liftoff of the pick-up suction roll 37 from the wire web 1 (or shortly before), the pressure control valves 64 and 67 adjust automatically to the effect that now the air pressure and water pressure will be raised. Consequently, the wire web cleaning system 40 is immediately able to separate the entire fiber web (with width P +2R) from the wire web 1 What this control achieves is that in normal operation the air and water consumption will be relatively low and that the wire web cleaning system 40 can automatically be put in a state where it carries a higher operating pressure, which is required in lifting the pick-up suction roll 37 off the wire web 1 or separating the entire fiber web.

Another possibility for reduction of the air and/or water consumption in normal operation is given by the following: A time relay 70 can be connected through lines 71 and/or 72 with the pressure control valves 64 and/or 67. This time relay can in adjustable time intervals initiate a temporary pressure increase in the lines 63 and/or 66. Achieved thereby, temporarily, is an increased cleaning effect at, on average, low air and water consumption.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A device for cleaning a wire web, the wire web supporting a fiber material web and defining a running direction, said device comprising:

two elongated members disposed parallel to each other and extending cross-wise to the running direction of the wire web, said two elongated members comprising an elongated approach member and an elongated departure member, said elongated approach member and said elongated departure member each having a wire guide surface contacting the wire web;

a blowing slot disposed between said elongated approach member and said elongated departure member, said blowing slot adapted to be connected to an air supply;

a wedge-shaped space defined by and between said elongated approach member and the wire web, said wedge-shaped space tapering in the running direction of the wire web; and a water spray system, said water spray system adapted to spray water into said wedge-shaped space.

2. The wire web cleaning device of claim 1, said elongated approach member and the wire web defining an angle α therebetween, said angle α ranging between 10° and 45°.

3. The wire web cleaning device of claim 1, wherein said elongated approach member and the wire web form an angle of 30° therebetween.

4. The wire web cleaning device of claim 1, wherein said spray system is a nozzle pipe with a plurality of flat spray nozzles.

5. The wire web cleaning device of claim 1, wherein said blowing slot is formed by a plurality of side-by-side bores.

6. The wire web cleaning device of claim 1, wherein said blowing slot is formed by a plurality of side-by-side individual slots.

7. The wire web cleaning device of claim 1, wherein said elongated departure member includes a step clearance disposed where the wire web leaves the wire guide surface.

8. The wire web cleaning device of claim 1, wherein said elongated approach member wire guide surface and said elongated departure member wire guide surface have about an equal length, and wherein an overall length of said elongated approach member is about 1.5 to 3 times the overall length of said elongated departure member.

9. The wire web cleaning device of claim 1, further comprising a support body, said elongated approach member and said elongated departure member engaging said support body, said support body providing an adjustable angle between said elongated approach member and the wire web, said support body pivotable about an axis disposed parallel to said blowing slot.

10. The wire web cleaning device of claim 1, further comprising a support body, said elongated approach member and said elongated departure member engaging said support body, said support body providing an adjustable angle between said elongated approach member and the wire webs, said support body movable in a direction toward and from the wire web.

11. The wire web cleaning device of claim 1, wherein said water spray system includes a distribution chamber and a nozzle chamber, said distribution chamber and said nozzle chamber being mutually parallel and extending cross-wise to the running direction of the wire web, said distribution chamber adapted to be connected to a water feed line, said distribution chamber communicating through a plurality of channels disposed across the width of the wire web with said nozzle chamber, said nozzle chamber provided with at least one spray opening.

12. The wire web cleaning device of claim 11, wherein said nozzle chamber is disposed immediately before said approach slat.

13. The wire web cleaning device of claim 11, wherein said nozzle chamber includes a water spray opening having a slit-type gap with an adjustable clearance.

14. The wire web cleaning device of claim 13, wherein said wire web comprises an endless wire web, said nozzle chamber disposed inside said endless wire web at a location where the fiber material web is separated from the wire web.

15. The wire web cleaning device of claim 14, wherein said water spray system delivers a quantity of water per centimeter of fiber material web width which is higher in the area of the two fiber material web edges than in the center area of the fiber material web.

16. The wire web cleaning device of claim 15, wherein said water spray system includes a spray pipe extending across the enter wire web width, and an edge spray pipe disposed in the area of the two fiber material web edges, said spray pipe and said edge spray pipe movable in a direction parallel to said blowing slot.

17. The wire web cleaning device of claim 14, with a pickup device disposed adjacent to the wire web, the pickup device movable to be lifted off the wire web, and further comprising a control device for selectively controlling the pressure of air supplied to said blowing slot and water supplied to said spray system, said control device selectively causing a pressure increase during one of shortly before and when the pickup device lifts off the wire web.

18. The wire web cleaning device of claim 1, further comprising a control device for selectively controlling the pressure of air supplied to said blowing slot and water supplied to said spray system.

* * * * *